Patented Apr. 4, 1950

2,502,966

UNITED STATES PATENT OFFICE 2,502,966

ALKYL SUBSTITUTED AMIDO PYROPHOSPHATES

Gennady M. Kosolapoff, Dayton, Ohio, assignor to Monsanto Chemical Company, St. Louis, Mo., a corporation of Delaware No Drawing. Application May 22, 1948, Serial No. 28,722

4 Claims. (Cl. 260—545)

1

The present invention is concerned with phosphorus-nitrogen-containing organic compounds and processes for their manufacture.

An object of this invention is to provide new and useful amidopyrophosphates. A further object is to provide certain technical compositions containing alkyl derivatives of amidophosphates.

This invention provides compounds having the general formula:

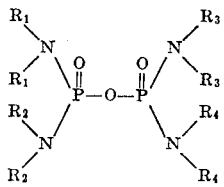

where $R_1$, $R_2$, $R_3$ and $R_4$ are alkyl groups having from 1 to 4 carbon atoms.

The present compounds are prepared by a process involving essentially the reaction of a chlorophosphorus compound and an alkoxy phosphorus compound, whereby the pyrophosphate is obtained by pyrolysis or condensation involving the elimination of the corresponding alkyl chloride.

The preparation of the above alkyl amidopyrophosphates may be further illustrated by the following method describing the preparation of the tetrakis(dimethylamido) pyrophosphate as a typical member.

Example

Seventeen grams of bis(dimethylamido) chlorophosphate and 18 grams of ethyl bis(dimethylamido) phosphate were heated to 170° C. to 175° C. with stirring for 15 minutes. It was observed that ethyl chloride was evolved during the reaction. When the ethyl chloride evolution had ceased, the reaction mixture was distilled and was found to give an 84% yield of the desired tetrakis(dimethylamido) pyrophosphate. The pure compound was found to have a boiling point of 139° C. to 140° C. at 1.5 mm. and was a colorless, somewhat viscous liquid having a refractive index $n_D^{25} = 1.4620$.

The temperature of reaction has been found to be advantageously maintained in the range of 100° C. to 200° C., and the reaction may be carried out either at atmospheric pressure, under vacuum or with a positive pressure as may be desired. It has also been found that the reactants may be preliminarily mixed and then heated, or

2 that either reactant may be added to the other which is maintained at an elevated temperature in the reaction vessel.

The bis(dimethylamido) chlorophosphate may be made by reacting phosphoryl chloride, $POCl_3$, with 4 moles of dimethylamine in the absence of a solvent. If desired, an inert solvent, such as toluene, may be employed, although this is not essential. Reaction takes place readily at room temperature; if the reaction becomes vigorous, it is desirable to cool the reaction mass to maintain a temperature below 30° C.

The ethyl bis(dimethylamido) phosphate may be made by the reaction of ethyl alcohol with phosphoryl chloride, present in excess to give a mixture of the various chloroethyl esters, with the monoethyl dichlorophosphates predominating. This mixture is fractionated to obtain the monoethyl dichlorophosphate in pure form. A similar reaction may be carried out using other aliphatic alcohols having from 2 to 4 carbon atoms, such as ethanol, n-propanol, isopropanol, n-butanol, isobutanol and tert.-butanol, in which the corresponding mono-alkyl dichlorophosphates are obtained.

The above mono-alkyl dichlorophosphates are reacted with an amine such as dimethylamine to obtain the monoalkyl bis(dimethylamido) phosphate. The amines employed may be amines with like or unlike alkyl radicals having from 1 to 4 carbon atoms, e. g., the methyl, ethyl, n-propyl, isopropyl, n-butyl, isobutyl, and tert.-butyl groups as the radicals present in diamines.

The general process to obtain the pyrophosphates utilizes the above described bis(dialkylamido) chlorophosphate and the alkyl bis(dialkylamido) phosphate in a pyrolysis or condensation in which an alkyl chloride is eliminated. The resultant product is then a pyrophosphate having two dialkyl amido groups bound to each phophorus atom as shown in the structural formula below:

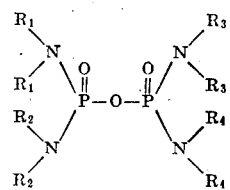

where $R_1$, $R_2$, $R_3$ and $R_4$ are alkyl radicals having from 1 to 4 carbon atoms.

In the general process utilizing the reactants set forth above, the temperature may be maintained above 100° C., preferably in the range of 100° to 200° C. The reaction may be carried out at atmospheric pressure, under vacuum, or with a positive pressure as may be desired. It has also been found that the reactants may be preliminarily mixed and then heated, or that either reactant may be added to the other which is maintained at an elevated temperature in the reaction vessel.

The compounds of the present invention are of utility in combating insect pests. For this purpose such compounds may be employed as the active ingredient of an insecticidal composition including a carrier which may be a powder, a solvent or an emulsion to provide a combination as a dust, a solution or an emulsion. The insecticidal activity of the tetrakis(dialkylamido) pyrophosphates of the invention is particularly apparent against insects of the sucking type.

The alkyl - substituted amidopyrophosphates herein disclosed are soluble in, and hence may be dissolved in, organic solvents such as carbon tetrachloride, ethyl dichloride, alcohol such as ethyl, isopropyl, or higher alcohols, esters such as ethyl acetate or an aromatic solvent such as benzene, ortho-dichlorobenzene, toluene or xylene. These phosphorus compounds may also be dissolved or emulsified with the usual petroleum solvents utilized for this purpose. Suitable emulsions may be made by dissolving the active material in xylene or the like, adding an emulsifying agent, and finally adding the xylene solution to water in the proper concentration when the material is to be used.

The products of the present invention may also be mixed in various proportions with finely divided carrier solids such as powdered sulfur, talc, pyrophyllite, bentonite, wood flour, starch, carbon black, and other powders which may be applied in combination with the present substituted amidopyrophosphates as an insecticidal dust.

The powders, solutions or emulsions may be applied to insect-infested vegetation by mechanical dusting or by atomizing the liquid solution or emulsion in the customary manner. When the present active compounds are employed in combination with solvents, dusts, or in emulsified form they maintain their high initial activity over a very broad range of dilutions and may be used without injury to the host plant.

The present alkyl amidopyrophosphates may be used as a substitute for nicotine or they may be combined with various nicotine salts in various proportions to obtain a combination insecticide having increased effectiveness against insect pests. The present products may also be combined with other insecticides, such as α,α-di(p-chlorophenyl)-β,β,β-trichloroethane (DDT) in various proportions.

The compounds of the invention are also useful as intermediates in the preparation of other compositions. The present phosphorus-nitrogen derivatives have been found to be valuable as solvents, particularly to dissolve acetylenic hydrocarbons. For example, acetylene or diacetylene may thereby be selectively removed from gas mixtures containing carbon dioxide and saturated hydrocarbons undesirable in an acetylene supply for chemical processing.

Since many changes could be made in the above methods and products without departing from the scope of the invention, it is intended that all matter contained in the above description shall be interpreted as illustrative and that my invention is not to be limited to the specific compositions and processes herein described, or specifically covered by my claims.

The nature and objects of the present invention having been thus described and illustrated, what is claimed, and is desired to be secured by Letters Patent of the United States is:

1. A process for preparing a compound having the general formula:

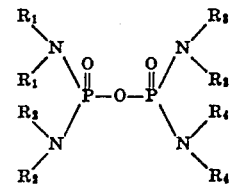

where $R_1$, $R_2$, $R_3$ and $R_4$ are alkyl groups having from 1 to 4 carbon atoms, which comprises condensing a compound of the formula:

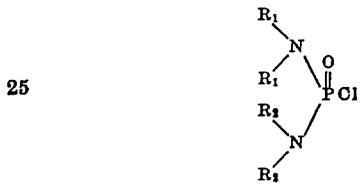

with a compound of the formula:

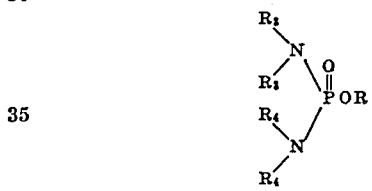

where X is an alkyl radical having from 2 to 4 carbon atoms and $R_1$, $R_2$, $R_3$ and $R_4$ have the same meaning as above.

2. A process for preparing a compound having the general formula:

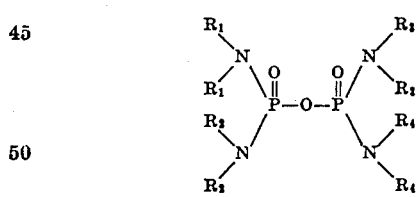

where $R_1$, $R_2$, $R_3$ and $R_4$ are alkyl groups having from 1 to 4 carbon atoms, which comprises condensing a compound of the formula:

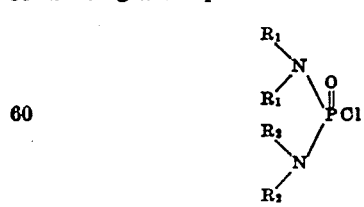

with a compound of the formula:

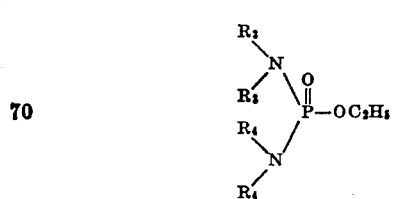

by heating to at least 100° C.

3. A process for preparing a compound having the general formula:

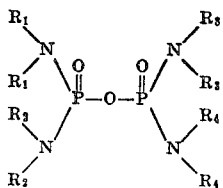

where $R_1$, $R_2$, $R_3$ and $R_4$ are alkyl groups having from 1 to 4 carbon atoms, which comprises condensing a compound of the formula:

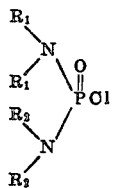

with a compound of the formula:

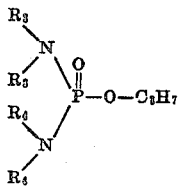

by heating to at least 100° C.

4. A process for preparing a compound having the general formula:

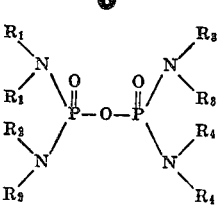

where $R_1$, $R_2$, $R_3$ and $R_4$ are alkyl groups having from 1 to 4 carbon atoms, which comprises condensing a compound of the formula:

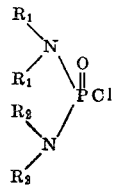

with a compound of the formula:

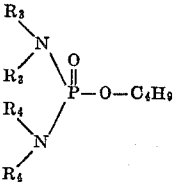

by heating to at least 100° C.

GENNADY M. KOSOLAPOFF.

REFERENCES CITED

The following references are of record in the file of this patent:

Zeile et al: "Ber. deut. Chem.," vol. 75 (1942), pp. 1127, 1128, 1133.